May 6, 1952 H. A. ROBINSON ET AL 2,595,608

AUTOMATICALLY TUNED WIDE RANGE RECEIVER AND TRANSMITTER

Filed Dec. 30, 1948 3 Sheets-Sheet 1

INVENTORS
Harris A. Robinson
& Olin L. MacSorley
BY Morris Rabkin
ATTORNEY

May 6, 1952 H. A. ROBINSON ET AL 2,595,608

AUTOMATICALLY TUNED WIDE RANGE RECEIVER AND TRANSMITTER

Filed Dec. 30, 1948 3 Sheets-Sheet 2

INVENTORS
Harris A. Robinson
& Olin L. MacSorley
BY Morris ... [signature]
ATTORNEY May 6, 1952 H. A. ROBINSON ET AL 2,595,608

AUTOMATICALLY TUNED WIDE RANGE RECEIVER AND TRANSMITTER

Filed Dec. 30, 1948 3 Sheets-Sheet 3

INVENTORS
Harris A. Robinson
& Olin L. MacSorley
BY Morris A. Rabkin
ATTORNEY

Patented May 6, 1952 2,595,608

UNITED STATES PATENT OFFICE 2,595,608

AUTOMATICALLY TUNED WIDE RANGE RECEIVER AND TRANSMITTER

Harris A. Robinson, Philadelphia, Pa., and Olin L. MacSorley, Collingswood, N. J., assignors to Radio Corporation of America, a corporation of Delaware Application December 30, 1948, Serial No. 68,298

8 Claims. (Cl. 250—20)

Figure 1:
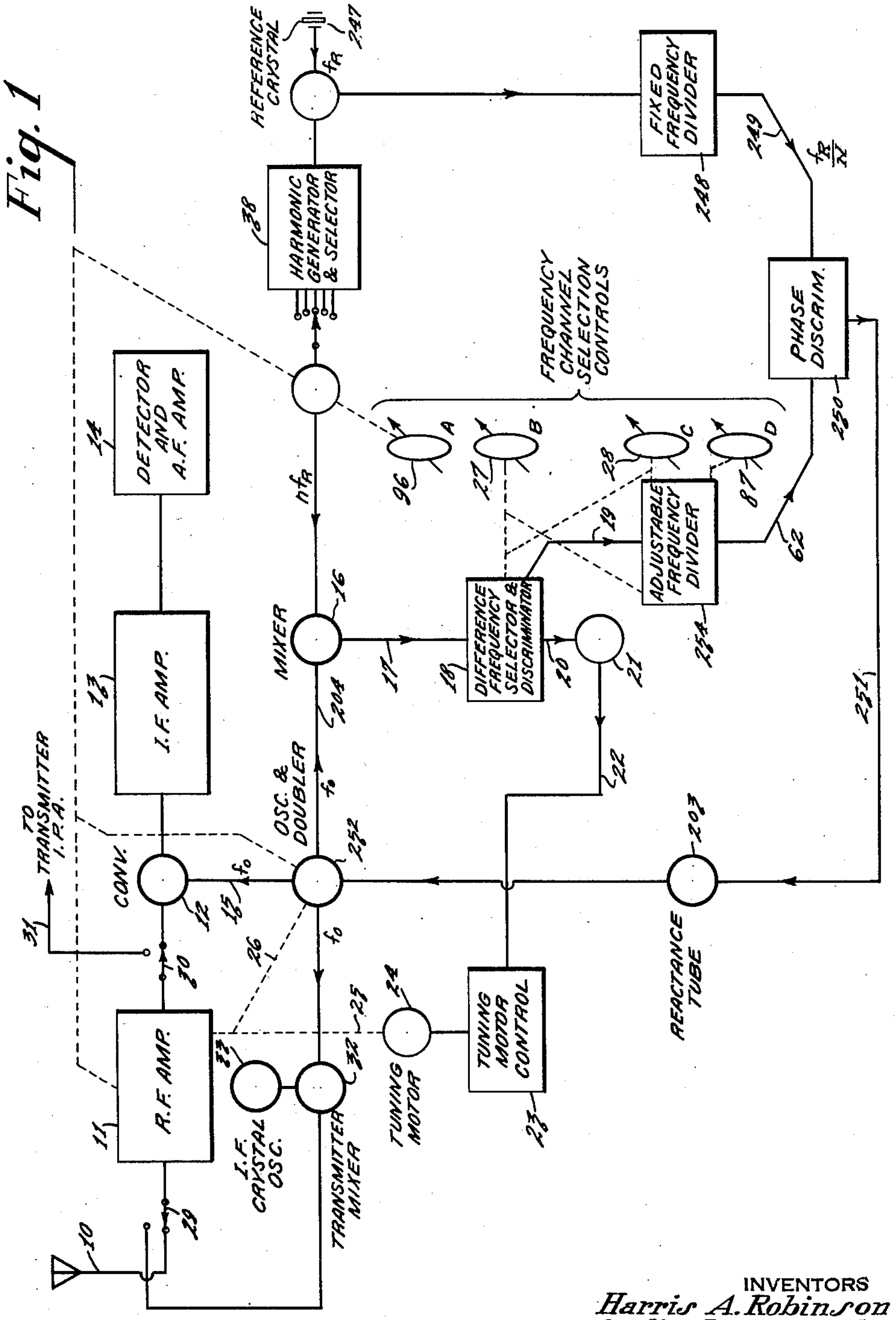

This invention is an improvement on that disclosed by a copending application of Harris A. Robinson, Serial No. 14,666, filed March 13, 1948, now Patent No. 2,568,412, granted September 18, 1951. It relates to an automatically tuned radio receiver and/or transmitter designed for operation over a wide frequency range with a high degree of stability.

The present invention has for its principal object the provision of an improved means for generating wave energy which is changeable through a very wide frequency range in a multiplicity of steps, equally spaced in frequency and which is very stable in operation at any selected discrete frequency in such range. It is like the invention of the aforesaid application in that the waves generated by a controllable frequency generator are used as heterodyning oscillations in a heterodyne receiver and as exciting oscillations in a transmitter. It is similar to the invention of the aforesaid application in that the output of the controllable frequency generator is combined with a constant frequency to produce a difference frequency which is detected by a frequency discriminator and is utilized to tune the controllable frequency generator and its associated circuits to the different frequencies within selected bands of frequencies.

A further object of the invention is the provision of an improved automatically tuned radio receiver wherein frequency dividers of the electronic type, together with a phase detector, are made to respond to the difference frequency and a constant reference frequency, producing a potential by which the output frequency of the controllable frequency generator is regulated with crystal accuracy.

To this end, the phase detector is made to respond (1) to a constant reference frequency and (2) to the output frequency of an adjustable division ratio frequency divider which has the difference frequency resulting from the mixing of the controlled oscillator and a selected harmonic of the reference crystal, supplied to its input. The two frequencies thus supplied to the phase detector are very nearly equal and slight variations in the difference frequency result in a phase detector output potential which is effective to regulate the output frequency of the controllable frequency generator with crystal accuracy.

The adjustable frequency divider may be similar to that disclosed in a copending application of Olin L. MacSorley, Serial No. 749,849, filed May 22, 1947. Other types of controllable frequency generators and adjustable division ratio frequency dividers may be utilized without surrendering any of the advantages of the invention.

The invention will be better understood from the following description considered in connection with the accompanying drawings and its scope is indicated by the appended claims.

Figure 2:
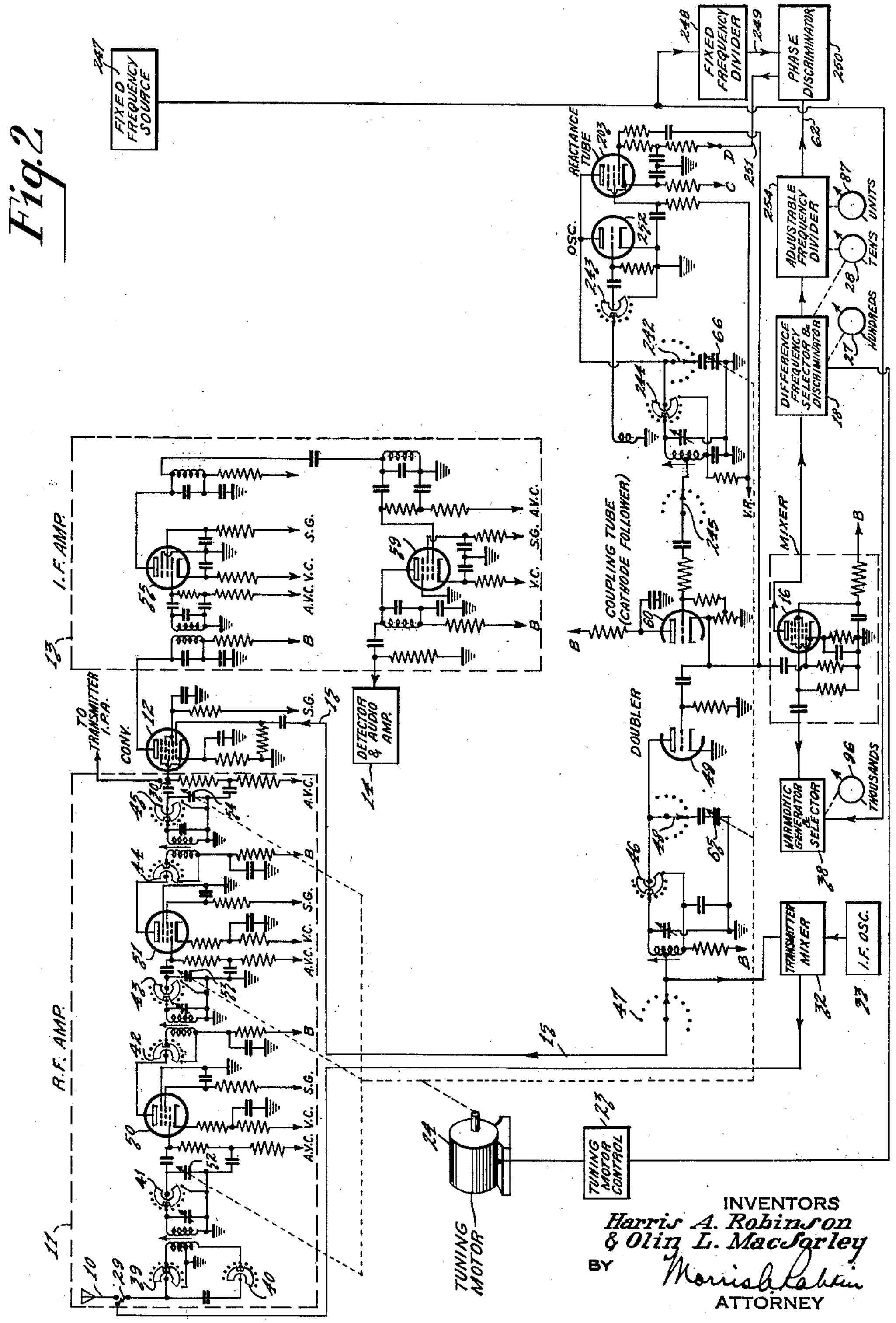
Figure 3:
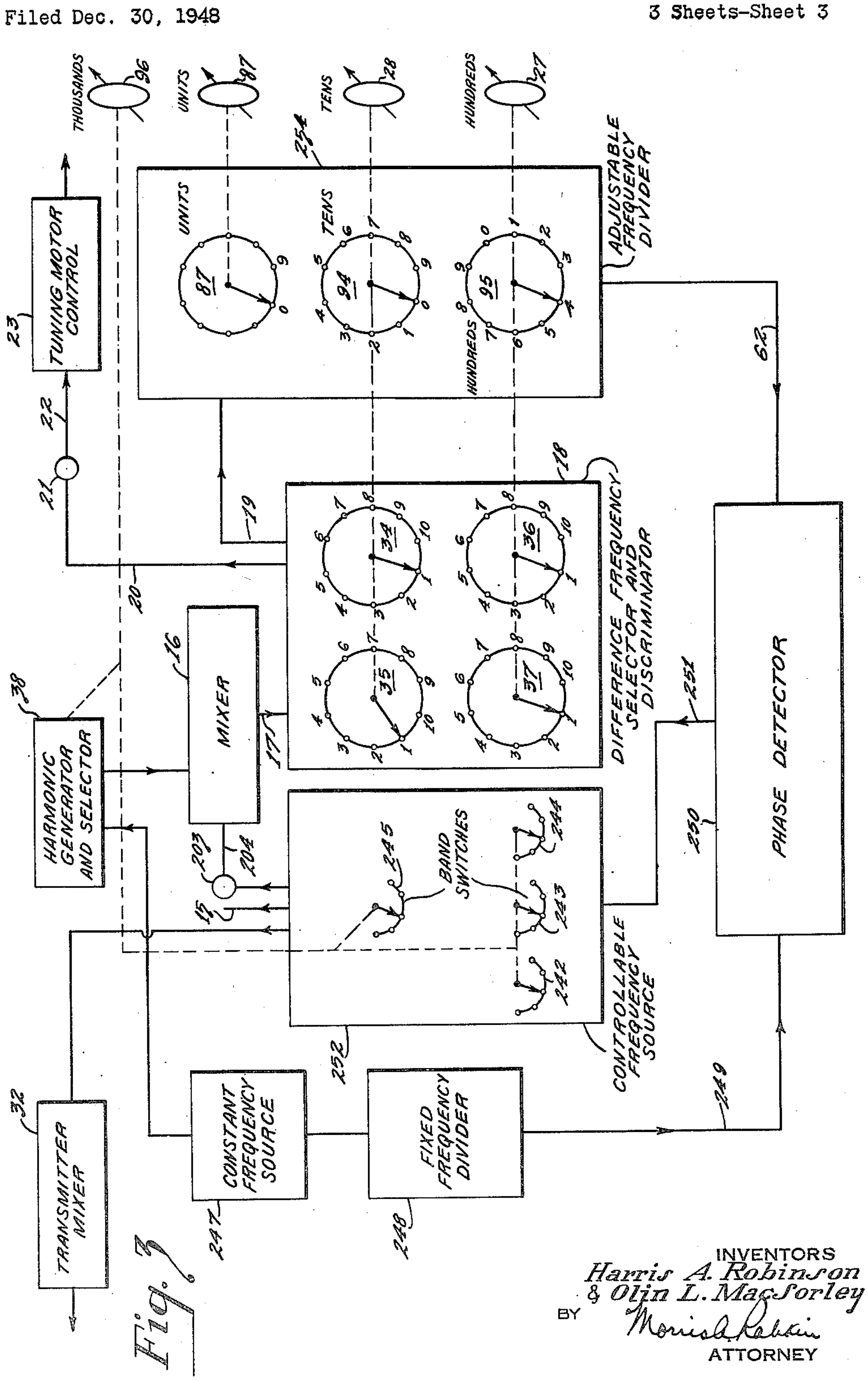

Referring to the drawings:

Fig. 1 illustrates the essential features of the invention in the form of boxes bearing explanatory legends, Fig. 2 illustrates the invention in the form of a wiring diagram with certain elements in the form of boxes bearing explanatory legends, and Fig. 3 is a block diagram bearing legends which indicate more specifically the relation between certain parts of apparatus of Figs. 1 and 2.

It is to be noted that the "Difference Frequency Selector and Discriminator," the "Harmonic Generator and Selector," the "Transmitter Mixer" and the fixed and adjustable frequency dividers appear in the drawings only as boxes bearing explanatory legends. The details of these various parts, which are shown in patents and copending applications, are well understood by those skilled in the art and are omitted in order to simplify the understanding of the invention.

As indicated above, the adjustable frequency divider may be similar to that disclosed by the said copending application Serial No. 749,849, filed May 22, 1947. The harmonic generator and selector may be similar to that of the copending application of Harris A. Robinson, Serial No. 14,666, filed March 13, 1948. The same is true of the difference frequency selector and discriminator circuits through which the beat frequency developed in the mixer is applied to the tuning motor control and to the adjustable frequency divider. The phase discriminator and oscillator frequency control circuit details may be similar to those disclosed in the copending application of John D. Woodward, Serial No. 743,234, filed April 23, 1947, which has now ripened into Patent #2,490,499, dated December 6, 1949.

The automatically tuned radio receiver-transmitter of Figs. 1 and 2 includes an antenna 10, a radio frequency amplifier 11, a converter tube 12, an intermediate frequency amplifier 13 and a detector and audio amplifier 14. A control element 96 functions (1) to operate the frequency band selection switches of the amplifier 11 and of the controllable frequency oscillation generator 252 and (2) to operate switches by which the required harmonic of the reference crystal 247 or its equivalent is selected.

Output potential from the controllable frequency source 252 is applied through a lead 15 to the converter tube 12 and through a lead 204 to a mixer 16. In the converter tube 12, the output frequency $f_0$ of the regulatable frequency source 252 is combined with the output of the radio frequency amplifier 11 to produce the input of the intermediate frequency amplifier 13. In the mixer 16, the frequency $f_0$ is combined with the selected harmonic $nf_R$ to produce a difference frequency output which is applied through a lead 17 to a difference frequency selector and discriminator 18.

The difference frequency selected by the difference frequency selector circuit of 18 is applied through a lead 19 to the input of the adjustable frequency divider 254. The output of the discriminator element of 18 is applied through a lead 20 to an amplifier 21 and thence through a lead 22 to a motor control device 23 from which a tuning motor 24 is operated. As indicated by broken lines 25 and 26, the motor 24 functions to tune the radio frequency amplifier 11 and the regulatable frequency source 252 to the selected operating frequencies of these two elements.

Three control elements 27, 28 and 87 are involved in setting the difference frequency selector and discriminator and the adjustable frequency divider for operation at different selected frequencies. The control element 27 simultaneously tunes the difference frequency selector and discriminator and adjusts the division ratio of the "hundreds" decade of the adjustable frequency divider. The control element 28 performs the same function in connection with the "tens" decade of the adjustable frequency divider. The control element 87 is utilized to adjust the division ratio of the "units" decade of the adjustable counter.

The output potential of the adjustable frequency divider 254 is applied through a lead 62 to a phase discriminator or detector 250. Also applied to this phase detector from the fixed reference frequency source 247 through a fixed frequency divider 248 and a lead 249 is a constant frequency $$\frac{f_R}{N}$$

The output of the phase detector 250 is applied through a lead 251 to a reactance tube or equivalent control 203 which is interconnected with the generator 252 and functions in a well known manner to regulate the output frequency of this generator with crystal accuracy at its different selected operating frequencies.

The control element 96 which functions as the "thousands" selector is utilized to select the desired harmonic of the fixed frequency source 247 and to operate the band selection switches of the radio frequency amplifier 11 and the controllable frequency generator 252.

When the apparatus is operated as a receiver, the switches 29 and 30 are in their illustrated closed positions, the transmitter lead 31 is disconnected, the control element 96 is operated to select a desired frequency segment in one of the several frequency bands, the control elements 27, 28 and 87 are operated to select a predetermined discrete frequency within the selected segment, and the output frequencies of the adjustable and fixed frequency dividers are compared in the phase detector to derive a potential by which the output frequency of the generator 252 is maintained with crystal accuracy.

When the apparatus is operated as a transmitter, the switches 29 and 30 are operated to connect the lead 31 to the amplifiers of the transmitter and to connect the input of the radio frequency amplifier to the generator 252 through a mixer 32 where its output is mixed with that of a stable I. F. oscillator 33 or equivalent frequency.

The relations existing between the various control elements are shown more clearly in Fig. 3. As here shown, the "tens" selector switch 94 of the adjustable frequency divider 254 is ganged with a tuning switch 34 of the frequency selector circuit and with a tuning switch 35 of the discriminator and is operated by the frequency selection control 28. Likewise the "hundreds" selector switch 95 of the divider 254 is ganged with a tuning switch 36 of the frequency selector circuit and with a tuning switch 37 of the frequency discriminator and is operated by control 27. It will be noted that each of the switches, together with the "units" switch 87, has ten fixed contacts so that a decade relationship in frequencies may be selected for controlling the frequency generator 252.

As indicated in Fig. 1 and Fig. 3, the "thousands" control element 96 performs two different functions. First, it selects the required harmonic from the generator 38. Second, it operates the band selector switches 39 to 45 (see Fig. 2) of the radio frequency amplifier 11 and the band switches 46 to 48 of the doubler 49, along with the band switches 242 to 245 (see Figs. 2 and 3) by which any one of the several tuning bands of the oscillation generator 252 may be selected.

At the completion of the automatic tuning cycle through the action of the frequency discriminator 18, the tuning motor control 23 and the tuning motor 24, the output frequency of the divider 254 is at substantially the same frequency as the output frequency of the divider 248 and slight phase variations between these two output frequencies function through the phase detector 250 to accurately stabilize the output frequency of the generator 252 at any selected one of the available multiplicity of frequencies.

As shown in greater detail in Fig. 2, the radio frequency amplifier 11 includes two stages 50 and 51. The band selector switches 39 to 45 determine the frequency band to which the amplifier will respond effectively. Each of these band switches has a number of fixed contacts so that any one of several different tuning elements, only one of which is shown, may be connected into the circuit by operation of the control element 96 (see Fig. 1). Tuning of the amplifier to the selected frequency is effected by the capacitors 52 and 53 which are under the control of the tuning motor 24. The input to the converter 12 is likewise tuned by the ganged capacitor 54.

The intermediate amplifier 13 of several conventional stages 55 and 59, derives its input from the converter 12, and delivers its output to the detector and audio amplifier 14.

Further details of the amplifiers 11, 13 and 14 are conventional and readily understandable without detailed explanation.

Output from the controllable frequency generator 252 is supplied through a coupling tube 60 of the cathode follower type (1) to the mixer 16 and (2) through frequency doubler 49 and the lead 15 to one of the grids of the converter 12. In this connection, it should be noted that the switches 46, 47 and 48, like those of the generator 252, are controlled by the control element 96 of Fig. 1 and that the tuning capacitors 65 and 66 of the doubler 49 and generator 252, like the tuning capacitors 52, 53 and 54 of the amplifier 11, are driven by the tuning motor 24.

The connections of the regulatable frequency generator 252, the reactance tube 203 and the phase discriminator 250 are shown in Fig. 2. Circuit details of a typical phase discriminator have been disclosed in the aforementioned Woodward patent.

The variable frequency generator 252 includes an oscillator triode which is interconnected with a reactance tube 203 in a conventional manner to deliver at an output terminal 204 oscillations of a frequency dependent on (1) the reactance of the tube 203, (2) the selected tuning coil connected to the anode by band switch 244, and (3) the position of the ganged tuning capacitor, section 66.

As indicated in Fig. 3, the difference frequency selector and discriminator 18 comprise a series of frequency selective circuits arranged to permit selection of one hundred frequencies in two decade steps. A typical example would be the selection of frequencies between 600 and 1050 kc. in ten 50 kc. steps by the "hundreds" control 27 and the subdivision of each of these 50 kc. steps into ten 5 kc. steps by the "tens" control 28. One convenient method of obtaining these two decades of frequency selective circuits has been disclosed in detail in the copending application of Olin L. MacSorley, Serial No. 743,266, filed April 23, 1947, now Patent No. 2,532,455, granted December 5, 1950. The method by which the tuned circuits of the difference frequency selector 18 are employed as frequency discriminators has been disclosed in detail in the above-identified copending application of Harris A. Robinson, Serial No. 14,666, filed March 13, 1948. The continuously tunable discriminator circuit (LC) in this earlier application is replaced by the two decade step frequency application in the present arrangement shown here in Figs. 1, 2 and 3. The automatic tuning method employed to initially tune the oscillation frequency generator 252 and the associated gang tuned circuits in the RF amplifier 11 has been previously disclosed in detail in the same copending application, Serial No. 14,666. The present invention features the combination of the automatically tuned oscillation frequency generator as applied to a radio receiver and/or transmitter as disclosed in the previously mentioned, copending application Serial No. 14,666 with the precise frequency control of the oscillation generator on a multiplicity of uniformly spaced frequencies as obtained by the use of adjustable frequency divider and phase discriminator as disclosed in the aforesaid Woodward patent.

The potential applied to the grid of the reactance tube 203 is determined by the phase relation between the pulses applied to the phase discriminator 250 from the leads 62 and 249. Thus, if the frequency of the pulses at the lead 62 tends to increase relative to those from the fixed reference source 247, a corrective potential is applied to the grid of the reactance tube 203, decreasing the frequency of the generator 252. When the frequency of the pulses at the lead 62 tends to decrease, the opposite effect is produced. Thus, the generator 252 delivers at each of its different selected operating frequencies an output frequency which is maintained with an accuracy determined by the stability of the fixed reference source 247.

As previously indicated, the control element 96 operates (1) to select the tuning coils of the generator 252, (2) to operate the corresponding band selection switches 39 to 48 by which the circuits of the amplifier and doubler 49 are enabled to accept the bands determined by such tuning coils, and (3) to select the desired output frequency from the harmonic generator 38. Corresponding adjustments with respect to the division ratio of the adjustable divider 254 and the tuning of the circuits of the difference frequency selector and discriminator 18 are made by the control elements 27 and 28. "Units" control 87 operates only in selecting the division ratio of the adjustable divider. The equipment is then automatically tuned to the frequency thus selected through the medium of capacitors 52, 53, 54, 65 and 66 which are controlled by the tuning motor 24 in response to the output of the difference frequency selector and discriminator 18.

The automatic tuning of the oscillation generator 252 and the associated ganged tuned RF amplifier 11 follows the following sequence:

(1) Selection of the desired frequency band and corresponding harmonic generator output by the "thousands" control 96.

(2) Setting the adjustable frequency divider 254 and the difference frequency selector-discriminator 18 by the "hundreds" and "tens" controls 27 and 28 and the "units" control 87 (adjusting the frequency divider only) to correspond with the desired frequency.

(3) During steps (1) and (2), the tuning motor control 23 functions to tune the oscillator 252 and associated ganged tuned circuits to a reference position (low frequency end of the selected tuning band).

(4) At completion of steps (1), (2) and (3), the tuning motor 24 rotates the tuning control over the frequency band beginning from the reference position. When the frequency of the oscillation generator 252 approaches the correct value corresponding to the frequency adjustments of controls 96, 27 and 28, the difference frequency from the mixer 16 passes through the difference frequency selector-discriminator 18, and the final positioning of the tuning is controlled by the discriminator output via control 23.

(5) The precise control of the oscillation generator 252 is obtained from the phase discriminator 250, which compares the phase of the difference frequency output 19, divided through the adjustable frequency divider 254, with the divided output from the stabilized reference frequency source 247, and supplies correcting bias and frequency control via reactance tube 203. This precise frequency control by means of the phase comparison and adjustable frequency divider has been disclosed in detail in the above-mentioned Woodward patent.

What the invention provides is an improved automatically tuned wide range receiver and/or transmitter which may be readily controlled to operate at closely spaced frequencies which are each regulated with crystal accuracy.

What is claimed is:

1. In a wide range radio receiver wherein the outputs of a radio frequency amplifier and a controllable frequency generator are combined to produce the input to an intermediate frequency amplifier and wherein the output of said controllable frequency generator is mixed with selected harmonic outputs of a substantially constant frequency generator, the combination of unitary manually operable means for tuning said radio frequency amplifier and said controllable frequency generator to accept a desired frequency band, a frequency discriminator and an adjustable division ratio frequency divider connected to respond to said mixed outputs, unitary means for tuning said discriminator and adjusting the division ratio of said divider, means responsive to the output of said discriminator for tuning said radio frequency amplifier and said controllable frequency generator to frequencies within said bands, and means responsive to the outputs of said frequency divider and of said constant frequency generator for accurately regulating each selected frequency of said controllable frequency generator.

2. In a wide range radio receiver wherein the outputs of a radio frequency amplifier and a controllable frequency generator are combined to produce the input to an intermediate frequency amplifier and wherein the output of said controllable frequency generator is mixed with selected harmonic outputs of a substantially constant frequency generator, the combination of unitary manually operable means for tuning said radio frequency amplifier and said controllable frequency generator to accept a desired frequency band, a frequency discriminator and an adjustable division ratio frequency divider connected to respond to said mixed outputs, unitary means for tuning said discriminator and adjusting the division ratio of said divider, means responsive to the output of said discriminator for tuning said radio frequency amplifier and said controllable frequency generator to frequencies within said bands, and means including a phase detector responsive to the outputs of said frequency divider and of said constant frequency generator for accurately regulating each selected frequency of said controllable frequency generator.

3. In a wide range radio receiver wherein the outputs of a radio frequency amplifier and a controllable frequency generator are combined to produce the input to an intermediate frequency amplifier and wherein the output of said controllable frequency generator is mixed with selected harmonic outputs of a substantially constant frequency generator, the combination of unitary manually operable means for selecting a harmonic output and for tuning said radio frequency amplifier and said controllable frequency generator to accept a desired frequency band, a frequency discriminator and an adjustable division ratio frequency divider connected to respond to said mixed outputs, unitary means for tuning said discriminator and adjusting the division ratio of said divider, means responsive to the output of said discriminator for tuning said radio frequency amplifier and said controllable frequency generator to frequencies within said bands, and means responsive to the outputs of said frequency divider and of said constant frequency generator for accurately regulating each selected frequency of said controllable frequency generator.

4. In a wide range radio receiver wherein a frequency converter is energized from the output of a radio frequency amplifier and from a controllable frequency generator through a frequency multiplier and wherein the output of said controllable frequency generator is mixed with selected harmonic outputs of a substantially constant frequency generator, the combination of unitary manually operable means for selecting a harmonic output of said constant frequency generator and a frequency band in said radio frequency amplifier, unitary means for tuning said radio frequency amplifier, said controllable frequency generator and said multiplier within said selected frequency band, a frequency discriminator and an adjustable division ratio frequency divider connected to respond to said mixed outputs, unitary means for tuning said discriminator and adjusting the division ratio of said divider, means responsive to the output of said discriminator for operating said second named unitary means to tune said radio frequency amplifier, said controllable frequency generator and said multipler to frequencies within said selected band, and means responsive to the outputs of said frequency divider and of said constant frequency generator for accurately regulating each selected frequency of said controllable frequency generator.

5. In a system for generating any selected one of a plurality of frequencies which are spaced uniformly in frequency interval throughout a wide frequency spectrum, the combination of a controllable frequency generator, a source of substantially constant frequency, means for selecting from said source any one of a group of frequencies each of which is substantially constant and is different from all the other frequencies of said group, means for mixing the output frequency of said generator with the selected frequency to produce a resulting difference frequency, an adjustable division ratio frequency divider, means for applying said difference frequency to the input of said frequency divider, and means responsive to the output frequency of said divider and to a substantially constant frequency of predetermined value derived from said source for accurately regulating each selected frequency of said controllable frequency generator.

6. A system as set forth in claim 5 characterized by the facts that the difference frequency is applied to the adjustable frequency divider through a difference frequency selector and that unitary means are provided for tuning said selector and for adjusting the division ratio of said divider.

7. A system as set forth in claim 5 characterized by the facts that the difference frequency is applied to means including a frequency discriminator for automatically and approximately tuning said controllable frequency generator and that unitary means are provided for tuning said discriminator and for adjusting the division ratio of said divider.

8. In a system for generating any selected one of a plurality of frequencies which are spaced uniformly in frequency interval throughout a wide frequency spectrum, the combination of a controllable frequency generator, a source of substantially constant frequency, means for selecting from said source any one of a group of frequencies each of which is substantially constant and is different from all the other frequencies of said group, means for mixing the output frequency of said generator with the selected frequency to produce a resulting difference frequency, an adjustable division ratio frequency divider, including a difference frequency selector; means for applying said difference frequency to the input of said frequency divider, a radio frequency amplifier adapted to be energized from the output of said controllable frequency generator, means including a frequency discriminator responsive to said difference frequency for automatically and approximately tuning said controllable frequency generator and said amplifier within a selected band of frequencies; means responsive to the output frequency of said divider and to a substantially constant frequency derived from said source for accurately regulating each selected frequency of said controllable frequency generator; and means for simultaneously adjusting the division ratio of said divider and the tuning of said discriminator.

HARRIS A. ROBINSON.
OLIN L. MACSORLEY.

REFERENCES CITED

The following references are of record in the file of this patent:

UNITED STATES PATENTS

| Number | Name | Date |
|---|---|---|
| 2,152,336 | Van Loon | Mar. 28, 1939 |
| 2,175,320 | Runge et al. | Oct. 10, 1939 |
| 2,240,428 | Travis | Apr. 29, 1941 |
| 2,248,442 | Stocker | July 8, 1941 |
| 2,405,765 | Smith | Aug. 13, 1946 |
| 2,406,125 | Ziegler | Aug. 20, 1946 |
| 2,452,601 | Ranger | Nov. 2, 1948 |
| 2,492,218 | Guanella | Dec. 27, 1949 |